United States Patent
Mizushima et al.

(10) Patent No.: US 7,820,080 B2
(45) Date of Patent: Oct. 26, 2010

(54) METHOD FOR PRODUCING POLARIZING FILM, POLARIZING FILM, AND IMAGE DISPLAY USING THE POLARIZING FILM

(75) Inventors: Hiroaki Mizushima, Osaka (JP); Tadayuki Kameyama, Osaka (JP); Youichirou Sugino, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 488 days.

(21) Appl. No.: 10/573,646

(22) PCT Filed: Sep. 28, 2004

(86) PCT No.: PCT/JP2004/014554
§ 371 (c)(1), (2), (4) Date: Nov. 21, 2006

(87) PCT Pub. No.: WO2005/031408
PCT Pub. Date: Apr. 7, 2005

(65) Prior Publication Data
US 2007/0207277 A1    Sep. 6, 2007

(30) Foreign Application Priority Data
Sep. 29, 2003    (JP)    .......... P.2003-338907

(51) Int. Cl.
*B29D 7/01*    (2006.01)
(52) U.S. Cl. .......... 264/1.34; 359/900; 359/491; 264/2.6; 264/2.7

(58) Field of Classification Search .......... None
See application file for complete search history.

(56) References Cited

U.S. PATENT DOCUMENTS

| | | | |
|---|---|---|---|
| 4,324,480 A * | 4/1982 | Nomura et al. | 396/618 |
| 4,591,512 A | 5/1986 | Racich et al. | |
| 5,374,972 A | 12/1994 | Nakane et al. | |
| 2002/0182427 A1* | 12/2002 | Kondo et al. | 428/522 |

FOREIGN PATENT DOCUMENTS

| | | |
|---|---|---|
| JP | 61-175602 | 8/1986 |
| JP | 5-346656 | 12/1993 |
| JP | 2000-105448 | 4/2000 |
| JP | 2002-333520 | 11/2002 |

OTHER PUBLICATIONS

Korean Office Action dated Dec. 14, 2007, Application No. 10-2006-7006144.
International Search Report of PCT/JP2004/014554 dated Jan. 11, 2005.
Chinese Office Action dated Jul. 13, 2007, Application No. 200480028322.1.

\* cited by examiner

*Primary Examiner*—Arnel C Lavarias
*Assistant Examiner*—Derek S Chapel
(74) *Attorney, Agent, or Firm*—Westerman, Hattori, Daniels & Adrian, LLP (57) ABSTRACT

A method for producing a polarizing film, including: a dyeing step and a stretching step, a plurality of films being dipped into at least one processing liquid without contacting each other.

12 Claims, 3 Drawing Sheets

METHOD FOR PRODUCING POLARIZING FILM, POLARIZING FILM, AND IMAGE DISPLAY USING THE POLARIZING FILM

FIELD OF THE INVENTION

This invention relates to a method for producing a polarizing film to be used for an image display such as a liquid crystal display device (LCD), an electroluminescence display device (ELD), a plasma display panel (PDP), and a field emission display (FED) and to the polarizing film obtained by the production method, the polarizing film being used particularly for the liquid crystal display device. Also, this invention relates to an optical film and a polarizing plate obtainable by stacking an optical layer on the polarizing film as well as to an image display having the polarizing film or the optical film.

BACKGROUND ART

A polarizing film used for an image display particularly for a liquid crystal display device) is required to have both of high transmittance and a high polarization degree in order to provide bright images of high reproducibility. The polarizing film has heretofore been produced by dyeing a film such as a polyvinylalcohol film with dichroic iodine or a dichroic substance such as a dichroic dye and then orienting the film by uniaxial stretching.

In recent years, due to an increase in demand for the liquid crystal display device, a demand for the polarizing film which is used for the liquid crystal display device has been increased. Further, a polarizing film having higher optical characteristics and excellent in in-plane uniformity free from irregularity, contaminant, and the like is in demand (see, for example, Reference 1). In order to increase an amount of production of the polarizing film with the high optical characteristics being maintained, increase in the number of polarizing films by means of expansion of current production equipment and a use of a film having a larger width have been tried. However, with such measures, time and a cost are incurred for the production equipment expansion, and it is difficult to manufacture the large width film, and it has been detected that the conventional method causes deterioration in optical characteristics and increases in irregularity and defect. Therefore, there is a demand for a method of conveniently increasing the production amount without deteriorating the optical characteristics. Though a method of stacking films and then stretching the stack film has been disclosed (see, for example, Reference 2) as such method, the method is specialized for the stretching part, and it is difficult to apply the method as it is to a series of production steps using a processing bath.

[Reference 1] JP-A-2001-290027
[Reference 2] WP-A-2002-333520

An object of this invention is to provide a convenient method for producing a polarizing film without deteriorating optical characteristics such as transmittance and a polarization degree, wherein the polarizing film is produced by using at least one processing bath. Another object of this invention is to provide the polarizing film obtainable by the production method, an optical film obtainable by stacking an optical layer on the polarizing film, and an image display using the polarizing film or the optical film.

DISCLOSURE OF TH INVENTION

The inventors have conducted extensive researches to solve the above-described problems to find that it is possible to attain the objects by a method for producing a polarizing plate described below, thereby accomplishing this invention. That is, the object of this invention has been attained by a polarizing film production method, a polarizing film, an optical film, an image display, and a polarizing film production apparatus described below.

1. A method for producing a polarizing film, comprising: a dyeing step and a stretching step, a plurality of films being dipped into at least one processing liquid without contacting each other.

2. The method for producing a polarizing film according to item 1, wherein the number of the films is 2 to 4.

3. The method for producing a polarizing film according to item 1, wherein a polyvinylalcohol film is dyed with a dichroic substance in the dyeing step, and then the dyed film is uniaxially stretched in the stretching step.

4. A polarizing film obtained by the method according to item 1.

5. An optical film comprising the polarizing film according to item 4 and an optical layer provided on at least one side of the polarizing film.

6. A liquid crystal panel comprising the polarizing film according to item 4.

7. An image display comprising the polarizing film according to item 4.

8. The liquid crystal panel according to item 6, wherein the liquid crystal panel is produced by an in-house production method.

9. The image display according to item 7, wherein the image display is produced by an in-house production method 10. An apparatus for producing a polarizing film, comprising a processing bath having a film delivery holder for dipping a plurality of films into at least one processing liquid without contacting each other 11. The apparatus for producing a polarizing film according to item 10, wherein the number of the films is 2 to 4.

12. The method for producing a polarizing film according to item 1, wherein a total stretch ratio is from 3.0 to 7.0.

Descriptions of reference numerals are as follows: 1 denotes the processing bath; 2 denotes the film delivery holder (roll); 3 denotes a processing liquid; 4 denotes a raw film, 5 denotes a delivered film; 6 denotes a polarizing film; 11 denotes a swelling step (bath); 12 denotes a dyeing step (bath); 13 denotes a crosslinking step (bath); 14 denotes an stretching step (bath); 15 denotes a water washing step (bath); and 16 denotes a drying step (bath).

BEST MODE FOR CARRYING OUT THE INVENTION

This invention is based on findings that it is possible to increase a production amount of polarizing films conveniently without deteriorating optical characteristics by processing a plurality of films together in at least one processing bath in a polarizing film production method wherein the polarizing films are produced by dyeing step for dipping the films into a processing liquid containing a dichroic substance and an stretching step for stretching the films by uniaxial stretching.

As the polarizing film, a film obtained by dyeing a raw film made from a polymer film such as a polyvinylalcohol (PVA) film with a dichroic substance such as iodine or a dichroic dye followed by uniaxial stretching is typically used. A polarizing plate is obtained by stacking a transparent protection layer serving as an optical layer on one side or both sides of the polarizing film.

The polymer film used for the raw film is not particularly limited, and it is possible to use a variety of polymer films. Examples of the polymer film are a PVA film (including partially formulated PVA film and a modified PVA film such as an acetoacetyl group modified PVA film), a polyethylene telephthalate (ET) film, an ethylene-vinyl acetate copolymer film, and partially saponified films thereof, a hydrophilic polymer film such as a cellulose film, an oriented polyene film such as dehydrated PVA and dechlorined polyvinylchloride, and the like. Among the above, the PVA film may preferably be used because of its excellent dyeability with the dichroic substance such as iodine.

A polymerization degree of a polymer used as a material for the polymer film may generally be in the range of from 500 to 10,000, preferably from 100 to 6,000, more preferably from 1,400 to 4,000. In the case of the saponified film, a degree of saponification may preferably be 75 mol % or more, more preferably 98 mol % or more, and yet more preferably in the range of from 98.3 to 99.8 mol %.

In the case of using the PVA film as the polymer film, the PVA film prepared by an arbitrary method such as a flow casting method wherein a liquid dissolved into water or an organic solvent is cast to form a film, a casting method, and an extrusion method may be used. A film having a retardation of polymer film of from 5 to 100 nm may preferably be used. In order to obtain a polarizing film having an in-plane uniformity, it is preferable that an in-plane retardation variation of the PVA film is minimized, and the in-plane retardation variation of the PVA film used as the initial raw film may preferably be 10 nm or less, more preferably 5 nm or less, in a measurement wavelength of 1,000 nm.

As optical characteristics of the polarizing film obtained by the production method of this invention, single transmittance of the polarizing film alone or the polarizing plate alone may preferably be 40% or more, more preferably 43% or more, particularly preferably in the range of from 43.3% to 45.0%. Also, it is preferable that a orthogonal transmittance which is measured by using two polarizing films or polarizing plates and overlapping them in such a fashion that absorption axes of the polarizing films are orthogonal to each other is minimized, and the orthogonal transmittance may preferably be from 0.00% to 0.050%, more preferably be from 0.00% to 0.030%, from practical point of view. A polarization degree may preferably be from 99.90% to 100%, particularly preferably from 99.93% to 100%, from practical point of view.

Though it is necessary to perform the dyeing step for dyeing the raw film such as the PVA film with the dichroic substance and the stretching step for controlling an orientation state of the dichroic substance in order to produce the polarizing film, an order for performing the steps is not particularly limited in this invention. However, a method of stretching the raw film after impregnating the raw film with the dichroic substance is preferred since it is possible to obtain a polarizing film having desired optical characteristics by the method. The stretching may preferably be the uniaxial stretching without limitation thereto, and a stretching method such as biaxial stretching and sequential stretching wherein stretching is performed for plural times in each of which an stretching direction is appropriately controlled may suitably be employed insofar as the method achieves a desired orientation state of the dichroic substance. There are two main types of methods for stretching the polarizing film, which are a dry stretching method and a wet stretching method, and it is possible to apply this invention to any production method without limitation to the above two methods insofar as a processing bath is used in the production method. Since this invention is characterized by the production by dipping in an identical processing liquid, it is preferable to use the wet stretching method wherein the stretching is performed in the processing bath. Particularly, in the case of dipping a plurality of films into one processing liquid, it is necessary to prevent contact between the films. When the films contact with each other, the fins are subject to troubles such as swelling, shifting or scratching due to stretching, adhesion to each other, and dye irregularity.

Figure 2:
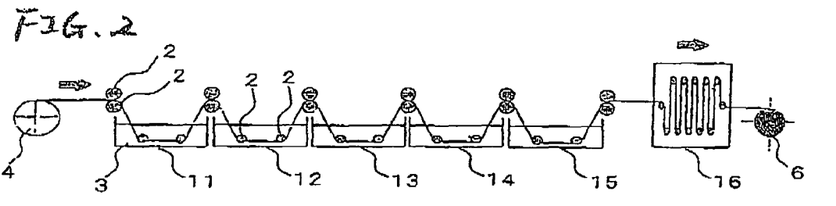
FIG. 2 is one example of a conventional polarizing film production process.

It is possible to employ an appropriate method as the polarizing film production method employing the wet stretching method according to conditions of the production method, and, in general, the polymer firm used as the raw film is produced by a production method including the series of production steps shown in FIG. 2, i.e. the swelling step, the dyeing step, the crosslinking step, the stretching step, the water washing step, and the drying step. In each of steps except for the drying step in the production method shown in FIG. 2, the films are dipped into the processing liquid formed of various solutions. An order of the steps as well as the number and implementation of each of the steps of swelling, dyeing, crosslinking, stretching, water washing, and drying are not particularly limited, and some of the processings may be performed together in one step or some of the processings may not be implemented. For example, the stretching step may be performed after the dyeing step or together with the swelling step and the dyeing step, or the dyeing step may be performed after the stretching step. Also, as the stretching step, it is possible to employ a suitable method without limitation. For example, in the case of using rolls for the stretching, a method of stretching by way of a peripheral speed difference between the rolls may preferably be employed. Further, an additive such as boric acid, borac, and potassium iodide may be added to each of the processing liquids, and the polarizing film according to this invention may contain boric acid, zinc sulfate, zinc chloride, potassium iodide, or the like when so required. Further, in some of processings, the film may be stretched in a direction of flow or width, and the water washing step may be performed in each of the processings.

According to this invention, a plurality of films are processed together in at least one of the steps processing baths) for producing the polarizing film. As the method of processing (dipping) the firms, a form and the number of the films as well as the number of the processing baths used for dipping the plural films thereinto are not limited, and it is possible to design them as required. In the drying step, too, plural films may be subjected to the processing together when so required or may be processed under different conditions.

As shown in FIGS. 3 to 7, it is possible to use, as a form of the processing bath, the mode wherein the film delivery holder is used for each of the plural films and the films are aligned horizontally (FIG. 3), vertically (FIG. 5), or horizontally and vertically (FIG. 6) or the mode wherein the plural films are processed by using the film delivery holders which is smaller in number than the films to be processed. In this case, the number of the films to be processed is not particularly limited insofar as the number is two or more, and it is preferable to process 2 to 4 films in view of convenience of the production apparatus and Stability of the processing bath. When the number of the films dipped into one processing liquid is too large, a large scale design change will undesirably be required and stabilization of a concentration of the processing liquid in the processing bath will undesirably be difficult. Also, though the films are disposed horizontally with respect to the bottom of the processing bath by way of example in the foregoing description, the films may be delivered perpendicularly or obliquely with respect to the processing bath bottom by adjusting a design of the processing bath and a tensile force of the films during delivery.

Figure 1:
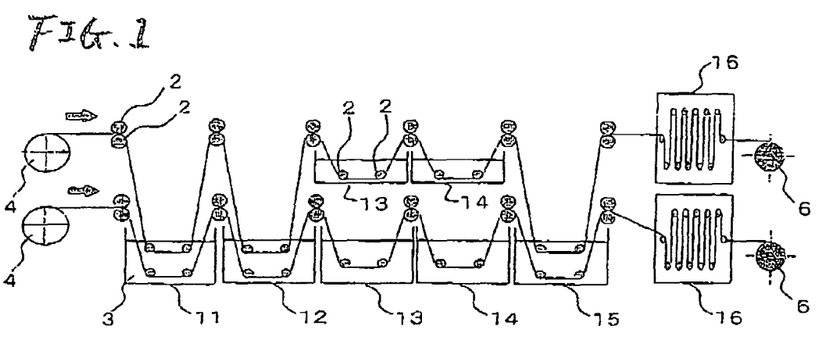
FIG. 1 is one example of a polarizing film production process according to this invention.

A form of the processing bath may be changed for each of the steps. Also, by processing the plural films together without film contact as in this invention, it is possible to design the method of processing the films in one bath after the films underwent different steps as shown in FIG. 1, or, to the contrary, it is possible to design a production method wherein the processing is divided into a plurality of steps from an intermediate step. Further, in the polarizing film production where it is important to design the optical characteristics by adjusting conditions in each of the steps, it is possible to change conditions such as a dyeing period and a stretch ratio of the films to be processed together by changing the design of each of the steps as required according to this invention, thereby making it possible to produce various types of polarizing films together by the use of a space which is the same as that has heretofore been used.

Though each of the steps except for the drying step is performed in a processing bath filled with a suitable solution (processing liquid) in the production method described above by way of example, two or more of the steps are performed in the processing bath together in this invention. It is necessary to provide the processing bath with a tub for storing the solutions and a holder for delivering the films.

As the tub for the processing bath, those strong and free from immersion of the solution required for the step may be used without particular limitation; and a material for the tub may preferably be a metal such as aluminum and stainless and a porcelain. A capacity of the tub may be changed when so required, and, in general, a tub having a capacity of about 1 to 200 m$^3$ is used.

Though a roll-shaped holder is typically preferred as the film delivery holder to be used for the processing bath, the holder is not limited thereto, and a belt conveyer type holder, a plate-like holder, a pinch-like holder, and a clip-like holder, or the like may be used as the film delivery holder. In the case of using the rolls as the film delivery holders, it is possible to adjust the tensile force during delivery by setting a peripheral speed difference between the rolls and it is possible to perform the stretching in the film flow direction. A material of a roll surface may preferably be a rubber based material or a metal based material. Examples of a shape of the surface include a concave type, a convex type, and a wavy type. Also, a curved roll may be used when so required. In the case where a central part of the roll is curved in the form of a convex, a stretching effect in a direction (film width direction) perpendicular to the film flow direction is expected. Further, a roll with a processed surface such as a grooved surface or an embossed surface may suitably be used when so required.

It is necessary to provide at least one film delivery holder in the processing liquid. As a method for disposing the film delivery holder, plural film delivery holders may be disposed in such a fashion as to hold the films from opposed sides of each of the films or an end of the film is held by using the pinch type or a clip type film delivery holder. Also, a several types of film delivery holders may be used in one step. The number and the types of the film delivery holders may be decided depending on the usage, and it is preferable to employ the method shown in FIG. 4 wherein the plural films are held by one roll or the method shown in FIGS. 3, 5, and 6 wherein one film is held by one roll.

Hereinafter, examples of the steps of the polarizing film production process by the wet stretching method will be described.

As the swelling step, films are dipped into a swelling bath filled with water. By such step, the polymer films are washed with water so that blots and an antiblocking agent on surfaces of the polymer films are cleaned off, and an effect of preventing non-uniformity such as irregular dyeing is expected by swelling the polymer films. Though it is preferable to use a distilled water (pure water) as the water, an aqueous solution obtained by adding glycerin, potassium iodide, or the like may be used. In this case, 5 wt % or less of glycerin or 10 wt % or less of potassium iodide may preferably be added with respect to a total amount of the swelling liquid. A temperature of the swelling liquid may preferably be in the range of from 20 to 45° C., more preferably from 25 to 40° C. A dipping period may preferably be from 2 to 300 seconds, more preferably from 30 to 240 seconds, particularly preferably from 60 to 180 seconds. The polymer films may be stretched in the swelling liquid, and a stretch ratio in this case is from about 1.1 to about 3.5 times with respect to an original length of the polymer films.

In the dyeing step, the polymer films are dipped into a dyeing liquid containing a dichroic substance such as iodine, so that the dichroic substance is absorbed by the polymer films to dye the polymer films.

Known substances can be used as the dichroic substance. Examples of the dichroic substances are iodine, an organic dye, and the like. Examples of the usable organic dye are Red BR, Red LR, Red R, Pink LB, Rubin BL, Bordeaux GS, Sky-blue LG, Lemon Yellow, Blue BR, Blue 2R, Navy RY, Green LQ Violet LB, Violet B, Black H, Black B, Black GSP, Yellow 3CY Yellow R, Orange LR, Orange 3R, Scarlet GL, Scarlet KGL, Congo Red, Brilliant Violet BK, Supra Blue Supra Blue GL, Supra Orange GL, Direct Sky-blue, Direct First Orange S, First Black, and the like. Among the above, iodine may preferably be used from the viewpoint of dyeability and orientation.

These dichroic substances may be used alone or in combination of two or more. In the case of using the organic dye, two or more of the organic dyes may be combined in order to achieve neutralization of a visible light region, for example. Examples of the combination are Congo Red and Supra Blue Q Supra Orange GL and Direct Sky-blue, and Direct Sky-blue and First Black.

As the solution (dyeing liquid) for the dyeing bath, a solution obtained by dissolving the dichroic-substance into a solvent is usable Water is typically used as the solvent, and an organic solvent having a compatibility with water may be added to the water. In this invention, a concentration of the dichroic substance in the solution may preferably be in the range of from 0.010 to 2.0 wt %, more preferably from 0.020 to 1.5 wt %, particularly preferably from 0.025 to 1.0 wt % with respect to a total amount of the dyeing liquid. When the concentration of the dichroic substance is less than 0.010 wt %, a remarkably long time is required for the dyeing to considerably reduce productivity. It is difficult to control the dyeing when the concentration exceeds 2.0 wt % since a desired dyeing amount is achieved in a remarkably short time and irregular dyeing is caused easily even by a minor trouble of the device with such concentration.

In the case of using iodine as the dichroic substance, it is preferable to add an iodide compound since the iodide compound further improves dyeing efficiency. Examples of the iodide compound are potassium iodide, lithium iodide, sodium iodide, zinc iodide, aluminum iodide, lead iodide, copper iodide, barium iodide, calcium iodide, tin iodide, titanium iodide, and the like. Among the above, it is preferable to add potassium iodide, and a ratio (weight ratio) of iodine to potassium iodide may preferably be in the range of from 1:5 to 1:100, more preferably from 1:6 to 1:80, particularly preferably from 1:7 to 1:70.

The period of dipping the polymer films into the dyeing liquid may preferably be from 10 to 600 seconds, more preferably from 30 to 300 seconds in this invention. When the dipping period is less than 10 seconds, it is difficult to achieve a desired dyeing amount, and the dipping period exceeding 600 seconds is undesirable since it is necessary to use a considerably large device and the productivity is deteriorated due to such dipping period. A temperature of the dyeing bath may preferably be in the range of from 5 to 42° C., more preferably from 10 to 35° C. Also, the polymer films may be stretched in this dyeing liquid, and a stretch ratio accumulated from the preceding steps in this stretching is from about 1.1 to about 4.0 from the original length of the polymer films before processing.

In the crosslinking step, the polymer films undergone the dyeing step are dipped into a processing liquid containing a crosslinking agent. Known substances can be used as the crosslinking agent. Examples of the crosslinking agent are a boron compound such as boric acid and borac, glyoxal, glutaric aldehyde, and the like. These crosslinking agents may be used alone or in combination of two or more. In the case of using two or more of the crosslinking agents in combination, a combination of boric acid and borac may be preferred, for example. Also, a ratio (molar ratio) of boric acid to borac may preferably be in the range of from 4:6 to 9:1, more preferably from 0.5.5:4.5 to 7:3, most preferably 6:4.

As a solution (crosslinking liquid) of the crosslinking bath, a solution obtained by dissolving the crosslinking agent into a solvent may be used. Water may be used as the solvent, for example, and an organic solvent having a compatibility with water may be contained. A concentration of the crosslinking agent in the solution may preferably be in and not limited to the range of from 1 to 10 wt %, more preferably from 2 to 6 wt %, with respect to a total amount of the crosslinking liquid.

An iodide compound may be added to the crosslinking liquid since in-plane uniformity of the polarizing film is achieved by the addition of the iodide compound. Examples of the iodide compound are potassium iodide, lithium iodide, sodium iodide, zinc iodide, aluminum iodide, lead iodide, copper iodide, barium iodide, calcium iodide, tin iodide, titanium iodide, and the like. A content of the iodide compound with respect to a total crosslinking solution amount may preferably be from 0.05 to 15 wt %, more preferably from 0.5 to 8 wt %. Among the above, a combination of boric acid and potassium iodide is preferred, and a ratio (weight ratio) of boric acid to potassium iodide may preferably be in the range of from 1:0.1 to 1:3.5, more preferably from 1:0.5 to 1:2.5.

A temperature of the crosslinking liquid is typically in the range of from 20 to 70° C. A period for dipping the polymer films may typically be in the range of from 1 second to 15 minutes, preferably from 5 seconds to 10 minutes. Further, a method of applying or spraying the solution containing the crosslinking agent may be employed as the crosslinking step, and the polymer films may be stretched in the crosslinking bath. A stretch ratio accumulated from the preceding steps in this stretching is from about 11.1 to about 4.0 from the original length of the polymer films before processing.

In the stretching step, a stretch ratio accumulated from the preceding steps is from about 2 to about 7 in a bath when the wet stretching method is employed.

As a solution (stretching liquid) in the stretching bath, a solution obtained by adding various metal salts and a compound of iodine, boron, or zinc can be used without limitation thereto. As a solvent of the solution, water, ethanol, or various organic solvents may suitably be used. Among the above, it is preferable to use a-solution obtained by adding about 2 to 18 wt % of boric acid and/or potassium iodide, respectively, with respect to a total amount of the stretching liquid. In the case of using boric acid and potassium iodide, a content ratio (weight ratio) may preferably be from about 1:0.1 to about 1:4, more preferably from about 1:0.5 to about 1:3.

A temperature of the stretching liquid may preferably be in the range of from 40 to 75° C., more preferably from 50 to 62° C.

In the water washing step, by dipping the polymer films into a solution (water washing solution) of a water washing bath, it is possible to wash off an unnecessary residue such as boric acid adhered to the polymer films. An iodide compound may be added to the solution, and sodium iodide or potassium iodide may preferably be used as the iodide compound. In the case of adding potassium iodide to the water washing liquid, a concentration of the potassium iodide may typically be from 0.1 to 10 wt %, preferably from 3 to 8 wt %, with respect to a total amount of the water washing liquid. A temperature of the water washing bath may preferably be from 10 to 60° C., more preferably from 15 to 40° C. Also, the number of the water washing steps to be performed is not particularly limited, and the water washing step may be performed for a plurality of times with the types and the concentrations of the additives in the water washing bath being changed for every steps.

In the case of removing the polymer films from each of the processing baths, a drainer roll such as a pinch roll may be used or excessive water may be removed by a method of chipping off a liquid with an air knife or the like in order to prevent dripping.

As the drying step, an appropriate method such as natural drying, wind drying, and heat drying may be employed, and, in general, the heat drying may preferably be employed. In the heat drying, a heating temperature may preferably be from about 20° C. to about 80° C. and a drying period may preferably be from about 1 to about 20 minutes.

A final stretch ratio (total stretch ratio) of the polarizing film produced by the above-described steps may preferably be from 3.0 to 7.0, more preferably from 5.0 to 6.3, with respect to the original length of the polymer films before processing. It is difficult to obtain a polarizing film having a high polarization when the total stretch ratio is less than 3.0, and the film is easily ruptured when the stretch ratio exceeds 7.0.

The production method according to this invention is not limited to the above described production method, and it is possible to apply the production method to another production method for obtaining a polarizing film. Examples of the applicable method are the above-described dry stretching method, a method of obtaining a polarizing film by forming a film by mixing a dichroic substance with a polymer film such as a polyethylene telephthalate (PET) film by kneading followed by stretching, a method of obtaining a polarizing film of O-type wherein a uniaxially oriented liquid crystal is used as a host and a dichroic dye is used as a guest (U.S. Pat. No. 5,523,863, JP-A-3-503322), a method of obtaining a polarizing film of E-type using a dichroic liotropic liquid crystal or the like (U.S. Pat. No. 6,049,428), and the like.

A thickness of the thus obtained polarizing film may preferably be from 5 to 40 μm without particular limitation thereto. Mechanical strength is not reduced when the thickness is 5 μm or more, and the optical characteristics are not deteriorated when the thickness is 40 μm or less to realize a thin-profile when applied to an image display.

It is possible to stack various optical layers on the polarizing film in practical use. The optical layer is not particularly limited insofar as it satisfies desired-optical characteristics. Examples of the optical layer include a transparent protection layer to be provided on one side or both sides of the polarizing film for the purpose of protecting the polarizing film. The polarizing plate is obtained by thus stacking the transparent protection layer on at least one side of the polarizing film. Further, on a surface of the transparent protection layer reverse to that adhered to the polarizing film or on the other side or both sides of the polarizing film, hard coating, an antireflection treatment, and a surface treatment for the purposes of sticking prevention, diffusion, or antiglare may be performed or an oriented liquid crystal layer for the purpose of viewing angle compensation or an adhesive layer for stacking another film may be stacked. Other examples of the optical layer include those obtained by stacking one or more of optical films used for forming an image display, such as a polarization converting element, a reflection plate or a semi-transmissive plate, a retardation plate (including a ½ or ¼ wavelength plate (λ plate)), a viewing angle compensation film, a brightness enhancement film. A reflection type polarizing plate or a semi-transmissive type polarizing plate obtainable by stacking the reflection plate or the semi-transmissive reflection plate on the polarizing plate obtained by stacking the transparent protection layer on the polarizing film, an elliptically polarizing plate or a circularly polarizing plate obtainable by stacking the retardation plate on the polarizing plate, a wide viewing angle polarizing plate obtainable by stacking the viewing angle compensation layer or the viewing angle compensation film on the polarizing plate, or a polarizing plate obtainable by stacking the brightness enhancement film on the polarizing plate may be preferred. In the case of stacking the optical layer or the optical film on the transparent protection layer, the stacking may be performed before or after the lamination with the polarizing film.

A material for forming the transparent protection layer to be provided on one side or both sides of the polarizing film may preferably be those excellent in transparency mechanical strength, thermostability, water shielding property, isotropy, and the like. Examples of the material are a polyester polymer such as polyethylene telephthalate and polyethylene naphthalate; a cellulose polymer such as diacetylcellulose and triacetylcellulose; an acyl polymer such as polymethylmethacrylate; a styrene polymer such as polystyrene and an acrylonitrilestyrene copolymer (AS resin); a polycarbonate polymer; and the like. Also, other examples of the polymer for forming the transparent protection layer are polyethylene, polypropylene, cyclo based polyolefin, polyolefin having a norbornene structure, a polyolefin polymer such as an ethylene/propylene copolymer, a vinylchoride polymer, an amide polymer such as nylon and aromatic polyamide, an imide polymer, a sulfone polymer, a polyethersulfone polymer, a polyetheretherketone polymer, a polyphenylene sulfide polymer, a vinyl alcohol polymer, a vinylidene chloride polymer, a vinyl butyral polymer, an arylate polymer, a polyoxymethylene polymer, an epoxy polymer, a blend of the above polymers, and the like. The transparent protection layer may be formed as a cured layer of a thermoset resin or a UV curable resin of acryl based, urethane based, acryl urethane based, epoxy based, silicone based, or the like. Among the above, it is preferable to use the triacetylcellulose film of which a surface is saponified with alkali or the like as the transparent protection layer to be laminated with the polarizing film according to this invention.

Also, other examples of the transparent protection layer include a polymer film disclosed in JP-A-2001-343529 (WO01/37007), such as a resin composition containing (A) a thermoplastic resin having a substituted and/or nonsubstituted imide group as a side chain and (B) a thermoplastic resin having a substituted and/or non-substituted phenyl group and a nitrile group as a side chain. Specific examples of the transparent protection layer include a film of a resin composition containing an alternating copolymer having isobutene and N-methyl maleimide and an acrylonitrile/strene copolymer. The film may be formed of a mixture extrusion article of the resin composition.

Though a thickness of the transparent protection layer is not particularly limited, the thickness is typically 500 μm or less and may preferably be from 1 to 300 μm, particularly preferably from 5 to 200 μm. Also, from the viewpoints of polarizing characteristics, durability, and improvement in adhesiveness, it is preferable to saponify the transparent protection layer surface with alkali or the like.

Also, it is preferable that the transparent protection layer is colorless. Therefore, a transparent protection layer having a retardation value in a film thickness direction represented by Rth)=(nx−nz)×d (wherein nx is a in-plane main refraction index of the film, nz is a film thickness direction refraction index, and d is a film thickness) of from −90 nm to +75 nm may preferably be used, and, with the use of such transparent protection layer, it is possible to reduce coloring (optical coloring) of the polarizing plate due to the transparent protection film. Further, the value of Rth may preferably be from −90 to +75, more preferably from −80 to +60 nm.

In the case of stacking the transparent protection layer on both sides of the polarizing film, the transparent protection layer stacked on one side and the transparent protection layer stacked on the other side may be different in characteristics from each other. The characteristics include, but not limited to, a thickness, a material a light transmittance, a tensile elasticity, presence or absence of the optical layer, and the like.

The hard coat treatment is performed for the purpose of preventing damages on the surface of the polarizing film or the polarizing plate obtained by stacking the transparent protection layer on the polarizing film. The hard coat treatment is achieved by a method of adding a curable film which is formed of an appropriate UV cable resin such as a silicone resin and excellent in hardness, slipping property, and the like to the surface of the transparent protection layer. The antireflection treatment is performed for the purpose of preventing reflection of external light on the polarizing plate and is achieved by forming an antireflection film or the like according to a conventional example.

The antiglare treatment is performed for the purposes of preventing inhibition of visual recognition with light transmitted through the polarizing plate due to external light reflected by the surface of the polarizing plate and the like. The antiglare treatment is achieved by imparting the surface of the transparent protection layer with fine irregularity by an appropriate method such as a surface roughening method employing sand blast method or an embossing method and a method of blending transparent fine particles. Usable as the fine particles to be contained for forming the surface fine irregularity structure are transparent fine particles such as inorganic fine particles having an average diameter of 0.5 to 50 µm, which are made from silica, alumina, titania, zirconia, tin oxide, indium oxide, cadmium oxide, antimony oxide, or the like and can be electroconductive and organic fine particles made from crosslinked or non-crosslinked polymer or the like. In the case of forming the surface fine irregularity, a usage amount of the fine particles may typically be from 2 to 70 parts by weight, preferably from 5 to 50 parts by weight, with respect to 100 parts by weight of the transparent resin forming the surface fine irregularity structure. The antiglare layer may be used also as a diffusion layer (having viewing angle widening function) for widening a viewing angle by diffusing the light transmitted through the polarizing plate.

Also, it is possible to provide the above-described optical layer such as the reflection prevention layer, the sticking prevention layer, the diffusion layer, and the antiglare layer directly on the transparent protection layer or the polarizing film or as a different component part from the transparent protection layer.

In the case of adhering the transparent protection layer to the polarizing film using an adhesive layer, the adhesion processing is not particularly limited, and it is possible to use an adhesive made from a vinyl polymer, an adhesive made at least from boric acid or borac, glutaric aldehyde or melamine, a water soluble crosslinking agent of a vinyl alcohol polymer containing oxalic acid, etc., or the like. The adhesive layer can be formed by applying a solution and then drying the solution, and it is possible to add another additive or a catalyst such as acid when so required during preparation of the solution. Particularly, in the case of using the polyvinylalcohol polymer film as the polarizing film, it is preferable to use the adhesive made from polyvinylalcohol from the viewpoint of the adhesiveness.

The reflection type polarizing plate is obtained by providing the reflection layer on the polarizing plate and used for forming a liquid crystal display device which displays images by reflecting light made incident from the visual recognition side (display side). The reflection type polarizing plate has advantages such as omission of a built-in light source such as a backlight and realization of a low profile liquid crystal display device. It is possible to form the reflection type polarizing plate by an appropriate method such as a method of providing a reflection layer made from a metal and the like on one side of the polarizing plate after forming the transparent protection layer and the like when so required.

Specific examples of the reflection type polarizing plate include those obtained by forming a reflection layer by providing a foil or a vapor deposition film made from a reflective metal such as aluminum on one side of the transparent protection layer undergone a matting treatment when so required and the like. Other examples of the reflection type polarizing plate include those obtained by imparting the transparent protection layer with the surface fine irregularity by mixing the transparent protection layer with the fine particles and then forming a reflection layer having a fine irregularity structure on the transparent protection layer. The reflection layer of the fine irregularity has advantages such as prevention of directivity and a glitter appearance by diffusing the incident light by diffused reflection and suppression of irregularity in brightness. The transparent protection layer containing the fine particles is advantageous in that the incident light and reflection light of the incident light are diffused when transmitting through the transparent protection layer so that brightness irregularity is further suppressed. The formation of the reflection layer having the fine irregularity representing the surface fine irregularity of the transparent protection layer is achieved by providing a metal directly on the transparent protection layer surface by an appropriate method such as a vapor deposition method (e.g. a vacuum vapor deposition method, an ion plating method, and a sputtering method) and a plating method.

In place of the method of directly providing the reflection plate on the transparent protection layer of the polarizing plate, a reflection sheet obtained by providing a reflection layer on a film appropriate for the transparent film may be used as the reflection plate. Since the reflection layer is ordinarily made from a metal, it is preferable to use the reflection plate in a state where a reflection surface of the reflection layer is covered with the transparent protection layer or the polarizing plate in view of prevention of reduction in reflection rate due to oxidation, long term duration of an initial reflection rate, avoidance of provision of another protection layer, and the like.

The semi-transmissive polarizing plate is obtainable by providing a semi-transmissive reflection layer reflecting and transmitting light such as a half mirror. The semi-transmissive polarizing plate is used for liquid crystal display devices and typically provided at the back of a liquid crystal cell so that the images are displayed by reflecting the incident light from the visual recognition side (display side) in the case where the liquid crystal display device is used in a relatively bright atmosphere and that the images are displayed by using the internal light source such as the backlight built into a backside of the semi-transmissive polarizing plate in a relatively dark atmosphere. That is, the semi-transmissive polarizing plate is useful for formation of a liquid crystal display device and the like, which is capable of conserving energy to be used for the light source such as the backlight under the bright atmosphere and using the built-in light source under the relatively dark atmosphere.

The elliptically polarizing plate or the circularly polarizing plate obtainable by further stacking the retardation plate on the polarizing plate will be described. In the case of changing linear polarization to elliptical polarization or circular polarization, changing elliptical polarization or circular polarization to linear polarization, or changing a polarization direction of linear polarization, the retardation plate or the like is used. Particularly, as the retardation plate for changing linear polarization to circular polarization or changing circular polarization to linear polarization, a so-called ¼ wavelength plate (also called λ/4 plate) is used. A ½ wavelength plate (also called λ/2 plate) is typically used for changing a polarization direction of linear polarization.

The elliptically polarizing plate is effectively used for compensating for (preventing) coloring C lue or yellow) caused by double refraction of a liquid crystal layer of a super twist nematic (STN) type liquid crystal display device to perform monochromatic display free from the coloring. Further, the elliptically polarizing plate which controls a three dimensional refraction index is preferred since it compensates for (prevents) coloring caused when a screen of the liquid crystal display device is viewed from an oblique direction. The circularly polarizing plate is effectively used for adjusting a color phase of images of a reflection type liquid crystal display device wherein the images are displayed by full color display and has a function of preventing reflection.

Examples of the retardation plate are a double refraction film obtainable by uniaxially or biaxially stretching a polymer material, an oriented film obtained by orienting, crossing, and copolymerizing a liquid crystal monomer, an oriented film of a liquid crystal polymer, and a retardation plate obtainable by supporting an oriented layer of a liquid crystal polymer by a film, and the like. The stretching processing may be performed by employing a roll stretching method, a stretching method, a tenter stretching method, and a tubular stretching method, or the like. A stretch ratio in the uniaxial stretching may typically be from 1.1 to 3 without limitation thereto. A thickness of the retardation plate is not particularly limited, too, and the thickness may typically be from 10 to 200 µm, preferably from 20 to 100 µm.

Examples of the polymer material is polyvinylalcohol, polyvinyl butyral, polymethyl vinylether, polyhydroxy ethyl acrylate, hydroxy ethyl cellulose, hydroxy propyl cellulose, methyl cellulose, polycarbonate, polyarylate, polysulfone, polyethylene telephthalate, polyethylene napbthalate, polyether sulfone, polyphenylene sulfide, polyphenylene oxide, polyarylate sulfone, polyvinylalcohol, polyamide, polyimide, polyolefin, polyvinyl chloride, a cellulose polymer, and binary copolymers thereof ternary copolymers thereof a graft copolymer, a mixture thereof, and the like. An oriented article (stretched film) is obtainable from each of the above polymer materials by stretching or the like.

As the liquid crystal monomer, both of a liotropic liquid crystal monomer and a thermotropic liquid crystal monomer may be used, and the thermotropic liquid crystal monomer may suitably be used in view of workability. Examples of the liquid crystal monomer are those having a fundamental skeleton of an acryloyl group, a biphenyl derivative obtained by introducing a functional group such as a vinyl group and an epoxy group, a phenyl benzoate derivative, a stilbene derivative, and the like. It is preferable that the liquid crystal monomer is oriented by employing a method using heat or light, a method of rubbing a substrate, a method of adding an orientation auxiliary agent, or the like and then subjected to fixation of the orientation by crosslinking and polymerization using light, heat, an electronic line, or the like with the orientation being maintained.

Examples of the liquid crystal polymer are those of a main chain type or a side chain type in each of which a conjugate linear atom group (mesogen) capable of imparting a liquid crystal orienting property is introduced into a main chain or a side chain of the polymer. Specific examples of the main chain liquid crystal polymer are a polyester liquid crystal polymer of a nematic orientation having a structure wherein a mesogen group is connected by a spacer part imparting refractivity, a discotic polymer, a cholesteric polymer, and the like. Examples of the side chain liquid crystal polymer are those having polysiloxane, polyacrylate, polymethacrylate, or polymalonate as a main chain skeleton and having a mesogen part formed of a para substituted cyclic compound unit capable of imparting nematic orientation via a spacer part formed of a conjugate atom group as a side chain and the like. A solution of the liquid crystal polymer is spread on an oriented surface of a thin film of polyimide or polyvinylalcohol formed on a glass plate and then heat-treated, the oriented surface being obtainable by rubbing processing or oblique vapor deposition of silicon oxide.

The retardation plate may have an appropriate retardation which is varied depending on an object of the usage, such as compensation for coloring and a viewing angle due to double refractions of the various wavelength plates and the liquid crystal layer, and optical-characteristics such as the retardation of the retardation plate may be controlled by stacking two or more retardation plates.

The elliptically polarizing plate or the reflection type elliptically polarizing plate is obtainable by stacking an appropriate combination of the polarizing plate or the reflection type polarizing plate and the retardation plate. Though the elliptically polarizing plate and the like can be formed by stacking the (reflection type) polarizing plate and the retardation plate to each other in the production process of the liquid crystal display device, the ready-to-use optical film such as the elliptically polarizing plate is advantageous since it improves production efficiency of the liquid crystal display device or the like due to excellent quality stability and workability in stacking.

The viewing angle compensation film is a film used for widening a viewing angle so that images are viewed relatively sharply in the case where the screen of the liquid crystal display device is viewed from a relatively oblique direction (not from a perpendicular direction). The viewing angle compensation film can be obtained by supporting an oriented film of a liquid crystal polymer or a transparent substrate by an oriented layer of a liquid crystal polymer. Though a polymer film uniaxially stretched in a surface direction and having a double refractivity is used for the typical retardation plate, a polymer film stretched biaxially in a surface direction and having a double refractivity a biaxial stretched film such as a polymer and an obliquely oriented film which are stretched uniaxially in a surface direction and in a thickness direction and having a double refractivity in which a refraction index in the thickness direction is controlled, or the like is used for the retardation plate used as the viewing angle compensation film. The obliquely oriented film may be obtained by adhering a heat shrinkable film to a polymer film and stretching and/or shrinking the polymer film due to shrinkage of the heat shrinkable film by heating or by obliquely orienting a liquid crystal polymer. The polymers described when describing the retardation plate in the foregoing are used as a raw material polymer for the retardation plate, and one of the raw material polymers which is appropriate for prevention of coloring due to change in viewing angle based on a retardation of liquid crystal cell, expansion of the viewing angle of good visual recognition, and the like is used.

It is preferable to use an optically compensating retardation plate obtainable by supporting, by a triacetylcellulose film, an optical anisotropic layer formed of the liquid crystal polymer oriented layer, particularly, the obliquely oriented layer of the discotic liquid crystal polymer.

Examples of the polarization converting element include an anisotropic reflection type polarizing element, an anisotropic diffusion type polarizing element, and the like. As the anisotropic reflection type polarizing element, it is preferable to use those having characteristics of reflecting either one of anticlockwise circular polarization and clockwise circular polarization and transmitting other types of light, such as those obtained by supporting a cholesteric liquid crystal layer, particularly an oriented film of a cholesteric liquid crystal polymer or an oriented liquid crystal layer thereof on a film substrate, those obtained by complexion with a retardation plate having a retardation of 0.25 times that of an arbitrary one of wavelengths of a reflection band thereon or those exhibiting characteristics of transmitting linear polarization of a predetermined polarization axis and reflecting other types of light, such as a multilayer stack body of dielectric multilayer thin films and thin films different in refraction index anisotropy Examples of the former anisotropic reflection type polarizing element include PCF series manufactured by Nitto Denxko Corporation and the like, and examples of the latter anisotropic reflection type polarizing element include DBEF series of 3M and the like. Also, a reflection type grid polarizer may suitably be used as the anisotropic reflection type polarizing element. Examples of the reflection type grid polarizer include Micro Wires manufactured by Moxtek, Inc. and the like. Examples of the anisotropic diffusion type polarizing element include DRPF manufactured by 3M and the like.

The polarizing plate obtained by laminating a polarizing plate with the brightness enhancement film is typically used as being provided on the backside of the liquid crystal cell. The brightness enhancement film exhibits characteristics of reflecting linear polarization of a predetermined polarization axis or circular polarization in a predetermined direction when natural light is made incident thereto due to the backlight or a reflection from the backside of a liquid crystal display device to transmit other types of light, and the polarizing plate obtained by stacking the brightness enhancement film and the polarizing film obtains transmitted light in a state of predetermined polarization by allowing light from the light source such as the backlight to enter and reflecting light other than the light in predetermined polarization. The brightness enhancement film allows the light reflected by the brightness enhancement film to enter again by reversing the reflected light by a reflection layer provided at the rear thereof; thereby allowing a part or whole of the reentered light to be transmitted as the light in predetermined polarization. Thus, the brightness enhancement film is capable of improving brightness by increasing a quantity of light transmitting therethrough and increasing a quantity of light to be used for liquid crystal image display and the like by supplying polarization which is hardly absorbed by the polarizing film. That is, in the case of allowing light to enter the polarizing film from the backside of the liquid crystal cell with the use of the backlight and without using the brightness enhancement film, almost all of the light in a polarization direction which disagrees with the polarization axis of the polarizing film is absorbed by the polarizing film to fail to transmit through the polarizing film. In other words, about 50% of the light is absorbed by the polarizing film to reduce a quantity of light to be used for the liquid crystal image display, thereby resulting darkened images (the percentage of absorbed light varies depending on characteristics of the polarizing film). The brightness enhancement film reflects the light having the polarization direction to be absorbed by the polarizing film without allowing such light to enter and causes the reflected light to repeatedly reenter the brightness enhancement film by reversing the reflected light by the reflection layer provided at the rear thereof so that only a part of the light reflected and reversed between the reflection layer and the brightness enhancement film, which is the polarization in the polarization direction capable of passing through the polarizer, is transmitted to be supplied to the polarizing film. Thus, the brightness enhancement film efficiently uses the light of the backlight or the like for displaying images of the liquid crystal display device to improve brightness of the screen.

It is possible to provide a diffusion plate between the brightness enhancement film and the reflection layer. The light reflected by the brightness enhancement film, which is in the polarization state, is directed to the reflection layer, and the reflected light is uniformly diffused when passing through the diffusion plate, so that the polarization state thereof is released to be in a non-polarization state (returns to the original natural light state). The light in non-polarization state, i.e. the natural light, is directed to the reflection layer and the like to be reflected by the reflection layer and the like and then passes through the diffusion layer again to reenter the brightness enhancement film. With the use of the diffusion plate which recovers the natural light state, the brightness of the display screen is maintained and irregularity of the display screen is eliminated, thereby providing a uniformly bright screen. It is considered that the number of reflections of the initial incident light is suitably increased with the use of the diffusion plate which recovers the natural light state, and such increase in the number of reflections contributes to the uniformly bright display screen in cooperation with the diffusion function of the diffusion plate.

As the brightness enhancement film, it is possible to use appropriate one of those having characteristics of transmitting linear polarization of a predetermined polarization axis and reflecting other types of light, such as a multilayer stack body of dielectric multilayer thin films, a multilayer stack body of thin films different in refraction index anisotropy, those having characteristics of reflecting either one of anticlockwise circular polarization and clockwise circular polarization and transmitting other types of light, such as those obtained by supporting an oriented film of a cholesteric liquid crystal polymer or an oriented liquid crystal layer of the oriented film on a film substrate, and the like.

Therefore, the brightness enhancement film of the above-described type which transmits the linear polarization of the predetermined polarization axis suppresses an absorption loss due to the polarizing plate and transmits light efficiently by allowing the transmitted light to enter with the polarization axis being coincided with that of the polarizing plate. The brightness enhancement film which transmits circular polarization, such as the cholesteric liquid crystal layer, allows the circular polarization to enter the polarizing film as it is, but it is preferable to change the polarization to linear polarization with the use of the retardation plate before allowing the circular polarization to enter the polarizing plate in view of the suppression of absorption loss. In addition, it is possible to convert the circular polarization into the linear polarization by using the ¼ wavelength plate as the retardation plate.

The retardation plate functioning as the ¼ wavelength plate in a wavelength range having a wide visible light region or the like is obtainable by a method of overlapping a retardation layer functioning as the ¼ wavelength plate with respect to monochromatic light having a wavelength of 550 nm with a retardation layer exhibiting another retardation property, such as a retardation layer functioning as a ½ wavelength plate and the like. Therefore, the retardation plate disposed between the polarizing plate and the brightness enhancement film may be formed of one or more retardation layers.

When the cholesteric liquid crystal layer has the structure of overlapping two or more layers different in reflection wavelength, such cholesteric liquid crystal layer is capable of reflecting the circular polarization in a wavelength range having a wide visible light region and the like, and it is possible to obtain transmitted circular polarization having a wide wavelength range based on such cholesteric liquid crystal layer.

The polarizing plate of this invention may be a stack of the polarizing plate and two or more optical layers as the above-described polarization separation type polarizing plate. Therefore, the polarizing plate may be the reflection type elliptically polarizing plate or the semi-transmissive elliptically polarizing plate obtained by combining the reflection type polarizing plate or the semi-transmissive polarizing plate and the retardation plate.

Though it is possible to obtain the optical film obtained by stacking the optical layers on the polarizing plate by a method of sequentially stacking the optical layers on the polarizing plate during the production process of liquid crystal display device or the like, the optical film obtained in advance of the production process is excellent in quality stability and assembly workability to advantageously improve the production process of liquid crystal display device or the like. Appropriate adhesion means such as an adhesive layer is used in the stacking. When adhering the optical layer to the polarizing plate, optical axes thereof may form an appropriate angel in accordance with a desired retardation property.

It is possible to provide the polarizing film according to this invention and the optical layer with an adhesive layer for adhering another component part such as the liquid crystal cell. The adhesive layer is not particularly limited, and it is possible to use an appropriate adhesive such as an acryl adhesive, a silicone adhesive, a polyester adhesive, a polyurethane adhesive, a polyether adhesive, and a rubber adhesive. As the adhesive, it is preferable to use those having a low moisture absorption rate and excellent in heat resistance in view of prevention of foaming and stripping due to moisture, prevention of reduction in optical characteristics, prevention of warping of liquid crystal cell due to thermal expansion difference and the like, and capability of forming high quality image display excellent in durability. Further, in view of preventing changes in optical characteristics of the polarizing film or the like, an adhesive which does not require high temperature processing for curing and drying, long curing processing time, and long drying time is preferred. From these viewpoints, the acryl adhesive is preferably used in this invention.

Also, the adhesive layer may have light diffusion ability by blending with fine particles. The adhesive layer may be provided only on a part requiring the adhesive layer, and, in the case of the polarizing plate having the polarizing firm and the transparent protection layer, the adhesive layer may be provided on one side or both side of the protection layer as required.

A thickness of the adhesive layer is not particularly limited, and the thickness may preferably be from 5 to 35 µm, more preferably from 15 to 25 µm. By keeping the thickness of the adhesive layer to this range, it is possible to mitigate stress caused by dimension behavior of the polarizing film and the polarizing plate.

In the case where the adhesive layer is exposed to the surface, it is preferable to temporarily cover the adhesive layer with a separator for the purposes of contamination prevention until the practical use. The separator may be formed by a method such as a method of providing a strippable coating using an appropriate stripping agent of silicone based, long chain alkyl based, or fluorine based or molybdenum sulfide or the like on a film appropriate for the transparent protection layer and the like.

Further, each of the transparent protection layer, the optical layer, and the adhesive layer forming the optical film and the polarizing plate may have UV absorption ability imparted by an appropriate method such as a method of treating with a UV absorbing agent such as an ester salicylate compound, a benzophenone compound, a benzotriazole compound, a cyanoacrylate compound, and a nickel complex salt compound.

It is possible to use the polarizing film according to this invention for forming image displays such as a liquid crystal display device (LCD), an electroluminescence display device (ELD), a plasma display panel (PDP), and a field emission display (FED), and the like.

It is possible to use the polarizing film of this invention for forming various devices such as the liquid crystal display devices including a reflection type liquid crystal display device, a semi-transmissive liquid crystal display device, and transmissive reflection type liquid crystal display device obtainable by disposing the polarizing film or the polarizing plate on one side or both sides of the liquid crystal cell. A liquid crystal cell substrate may be either one of a plastic substrate and a glass substrate. The liquid crystal cell for forming the liquid crystal display device is selected arbitrarily, and an appropriate liquid crystal cell such as an active matrix diving type represented by a thin film transistor type and a simple matrix driving type represented by a twist nematic type and a super twist nematic type are usable.

In the case of providing the polarizing plate or another optical film on both sides of the liquid crystal cell, the optical film may be the same as or different from the polarizing plate. In the formation of the liquid crystal display device, one or more layers of an appropriate component part such as a prism array sheet lens array sheet, a light diffusion plate, and a backlight may be formed on an appropriate position.

Hereinafter, an organic electroluminescence display device (organic EL display device) will be described. In general, the organic EL display device has a light emitter (organic electroluminescence light emitter) which is obtainable by stacking a transparent electrode, an organic light emitting layer, and a metal electrode on a transparent substrate in this order. The organic light emitting layer is a stack body of various organic films, and stack bodies of various combined structures are known, such as a stack body of a hole injection layer made from a triphenylamine and the like and a light emitting layer made from a fluorescent organic solid such as anthracene, a stack body of the light emitting layer and an electron injection layer made from a perylene derivative and the like, and a stack body of the hole injection layer, the light emitting layer, and the electron injection layer.

The organic EL display device emits light based on the principle that a hole and an electron are injected into the organic light emitting layer when a voltage is applied to the transparent electrode and the metal electrode, and the fluorescent substance is excited by energy generated by recombination of the hole and the electron, so that the fluorescent substance emits light when the fluorescent substance returns to a ground state after the excitation. The recombination mechanism is the same as ordinary diodes, and, as is expected from such recombination mechanism, a current and light emission intensity exhibit strong nonlinearity with respect to the applied voltage due to a rectifying property.

In the organic EL display device, in order to bring out the light emission in the organic light emitting layer, at least one of the electrodes must be transparent, and a transparent electrode formed of a transparent electroconductive body such as indium tin oxide (ITO) is typically used as an anode. In turn, it is important to use a substance having a small work function for a cathode in order to increase light emission efficiency by facilitating the electron injection, and an Mg-AG metal electrode, an Al—Li metal electrode, or the like is typically used as the cathode.

In the organic EL display device having the above-described constitution, the organic light emitting layer is typically formed of a remarkably thin film having a thickness of about 10 nm. Therefore the organic light emitting layer transmits light almost perfectly as the transparent electrode. As a result, light entered from a surface of a transparent substrate during a non-light emission period is reflected by the metal electrode after transmitting through the transparent electrode and the organic light emission layer to exit from the surface of the transparent plate, so that a display screen of the organic EL display device looks like a mirror surface when viewed from outside.

In the organic EL display device having the organic electroluminescence light emitter including the transparent electrode disposed on a front face of the organic light emitting layer which emits light by voltage application and the metal electrode disposed on a backface of the organic light emitting layer, it is possible to provide the polarizing plate on the front face of the transparent electrode, and it is possible to provide a retardation film between the transparent electrode and the polarizing plate.

Since the retardation film and the polarizing film have a function of polarizing light entered from outside and reflected by the metal electrode, they have an effect of inhibiting the mirror surface of the metal electrode from being visually recognized from outside by the polarizing function. Particularly, it is possible to perfectly shield the mirror surface of the metal electrode by forming the retardation film using a ¼ wavelength plate and adjusting an angle formed by polarization directions of the polarizing plate and the sift difference film to π/4.

That is, only a linear polarization component of the external light entered from the organic EL display device is allowed to transmit through the organic EL display device. The linear polarization is usually changed to elliptical polarization by the retardation film or to circular polarization particularly when the retardation film is the ¼ wavelength plate and the angle formed by polarization directions of the polarizing plate and the sift difference film is π/4.

The circular polarization transmits through the transparent substrate, the transparent electrode, and the organic thin film to be reflected by the metal electrode and then transmits through the organic thin film, the transparent electrode, and the transparent substrate to be the linear polarization again by the retardation film. The linear polarization cannot transmit through the polarizing plate since it is perpendicular to the polarization direction of the polarizing plate. As a result, it is possible to perfectly shield the mirror surface of the metal electrode.

In the PDP, discharge is caused in a rare gas, particularly a gas mainly including neon, enclosed in the panel, and phosphors of R, G and B applied on the cells of the panel are generated by vacuum UV rays generated by the discharge, so that images are displayed.

In the above-described liquid crystal display device market, an in-house production where processing steps of punching, selection, and lamination of the organic film whole cloth are performed integrally is required in order to lower the price. In this invention, in the case of using the cut polarizing-plate as the display as it is though the size of a chip cut polarizing film is arbitrary, each of a length and a width is generally from 10 to 130 cm. Though an upper limit of the size of the display is not particularly limited, the size depends on the transparent protection film currently available and a width of substrate for the polarizing film, such as the PVA film. In the in-house production method, where processings from a post processing (cutting) of the optical film to the lamination to the cell are integrally performed, a defective area must be immediately detected. Therefore, it has heretofore been necessary to perform an inspection step after the chip cutting to eliminate the defective products in the inspection step. However, since the polarizing film obtained by this invention is excellent in in-plane uniformity, it is unnecessary to perform the inspection step and a transporting step, a packing step, and unpacking step for the inspection step after the chip cutting, and it is possible to perform a step of laminating the polarizing film with an image display element such as a liquid crystal display element and an EL display element as one line.

EXAMPLES

The present invention is now illustrated in greater detail with reference to Examples and Comparative Examples, but it should be understood that the present invention is not to be construed as being limited thereto.

Example 1

Figure 3:
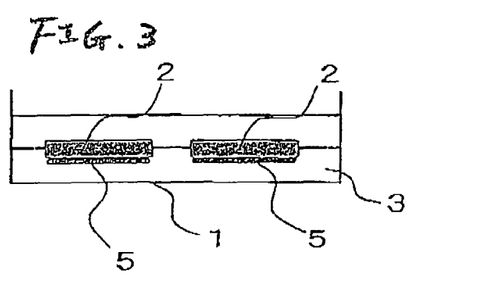
FIG. 3 is a sectional view showing a section of a processing bath as viewed from a delivery direction in the case where two film delivery holders are used and films to be delivered are aligned horizontally to form two rows.

A polarizing film having a thickness of about 28 μm was obtained by using a polyvinylalcohol (PVA) film (manufactured by Kurary Co., Ltd., polymerization degree 2,400) having a thickness of 75 μm and a width of 100 nm and performing swelling, dyeing, crosslinking, stretching, water washing, and drying steps. In producing the polar film, two films are processed in a state where two rolls each of which a surface containing polyvinyl chloride and NBR as main ingredients are aligned horizontally as film delivery holders in each of swelling, dyeing, crosslinking, stretching, and water washing baths as shown in FIG. 3. A triacetylcellulose film (thickness: 80 μm) which had been saponified by dipping in an alkali solution for 60 seconds was laminated on both sides of the polarizing film using a PVA adhesive, and then the laminated film was dried at 60° C. for 4 minutes to obtain a polarizing plate. In each of the steps, the films are delivered by using the rolls as shown in FIG. 1, and the stretching was performed by using a peripheral speed difference of the pinch rolls before and after the step. Conditions for each of the steps in the production of the polarizing film were as follows.

(Swelling step) 3.0-times stretching in pure water of 30° C.

(Dyeing step) Dipping in a 0.5 wt % iodine solution (J/KI (weight ratio)=1/10) of 30° C. for 60 seconds.

(Crosslinking step) Dipping in a solution containing 3 wt % of boric acid and 2 wt % of KI of 30° C. for 60 seconds.

(Stretching step) Stretching in a solution containing 4 wt % of boric acid and 3 wt % of KI of 60° C. until a total stretch ratio of 5.5 times was achieved.

(Water washing step) Dipping in a 5 wt % KI solution of 30° C. for 20 seconds, and then moisture was removed by using an air knife.

(Drying step) Drying at 50° C. for 1 minute with a tensile force being maintained.

Single transmittance and a polarization degree of the obtained polarizing plate were measured. The measurement results are shown in Table 1.

Example 2

Figure 7:
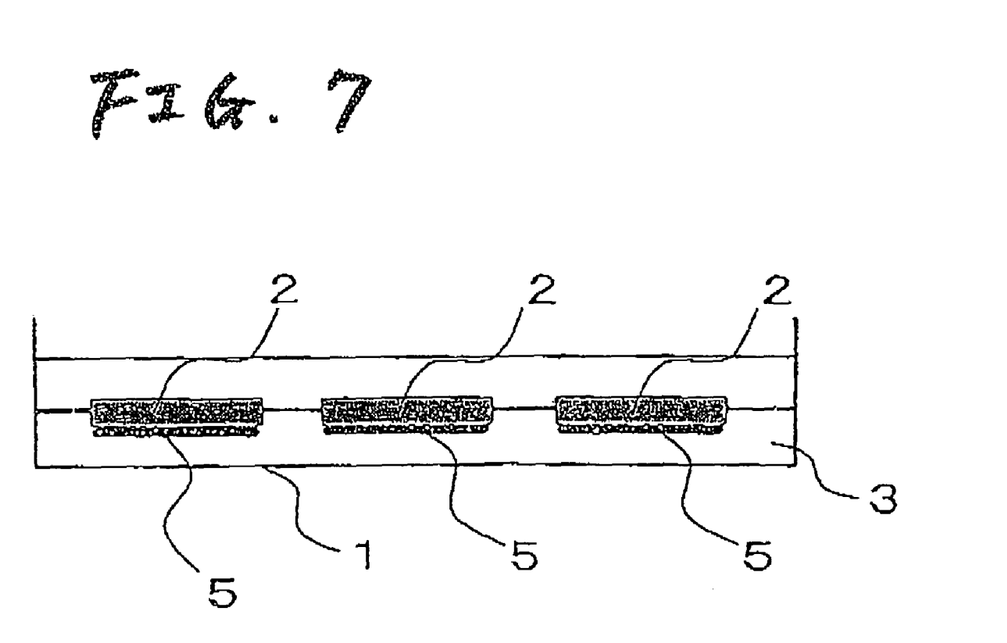
FIG. 7 is a sectional view showing a section of a processing bath as viewed from the delivery direction in the case where three film delivery holders are used and films to be delivered are aligned vertically and horizontally to form three rows.

A polarizing film and a polarizing plate were obtained in the same manner as in Example 1 except for processing three films by aligning them horizontally in each of the processing baths as shown in FIG. 7. Measurement results of the obtained polarizing plate are shown in Table 1.

Example 3

Figure 5:
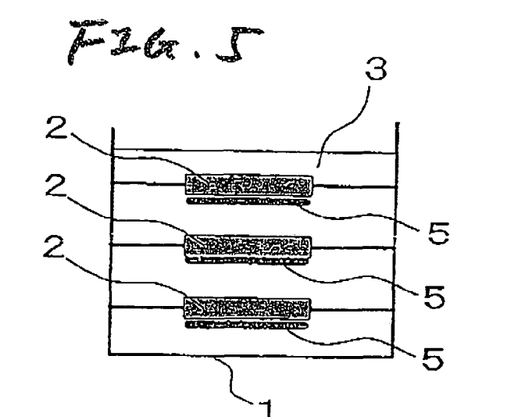
FIG. 5 is a sectional view showing a section of a processing bath as viewed from the delivery direction in the case where films to be delivered are aligned vertically to form three columns.
Figure 6:
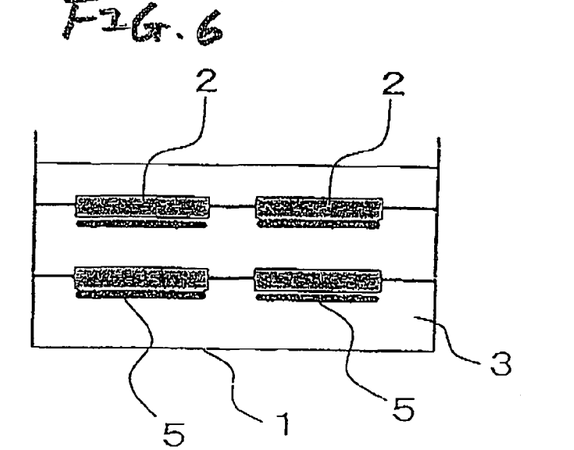
FIG. 6 is a sectional view showing a section of a processing bath as viewed from the delivery direction in the case where films to be delivered are aligned vertically and horizontally to form two rows each consisting of two columns.

A polarizing film and a polarizing plate were obtained in the same manner as in Example 1 except for processing two films by aligning them vertically in each of the processing bath as shown in FIG. 5. Measurement results of the obtained polarizing plate are shown in Table 1.

Referential Example

A polarizing film and a polarizing plate were obtained in the same manner as in Example 1 except for using a PVA film having a width of 100 mm and using one roll for delivering one film as shown in FIG. 2. Measurement results of the obtained polarizing plate are shown in Table 1.

Comparative Example 1

A polarizing film and a polarizing plate were obtained in the same manner as in Example 1 except for using a PVA film having a width of 200 mm and using one roll for delivering one film as shown in FIG. 2 (conventional method). Measurement results of the obtained polarizing plate are shown in Table 1.

Comparative Example 2

A polarizing and a polarizing plate were obtained in the same manner as in Example 1 except for using a PVA film having a width of 300 mm and using one roll for delivering one film as shown in FIG. 2 (conventional method). Measurement results of the obtained polarizing plate are shown in Table 1.

Optical Characteristics Measurement Method

Each of the polarizing plates prepared by Examples, Referential example, and Comparative Examples was cut at an angle of 45° with respect to the stretching direction into pieces each having the size of 35 mm×25 mm, and single transmittance, parallel transmittance ($H_0$), and orthogonal transmittance ($H_{90}$) were measured by using a spectrophotometer to obtain a polarization degree from the measured values using the following equation Note that each of the transmittances was a Y value obtained by performing visibility correction in accordance with a 2 degree visual field (C light source) of JIS Z 8701.

$$\text{Polarization degree} = \{(H_0 - H_{90})/(H_0 + H_{90})\}^{1/2} \times 100$$

From the results shown in Table 1, it is apparent that the polarizing film excellent in optical characteristics (polarization degree) is obtainable without a reduction in production amount.

While the present invention has been described in detail and with reference to specific embodiments thereof, it will be apparent to one skilled in the art that various changes and modifications can be made therein without departing from the spirit and scope thereof.

The present application is based on Japanese Patent Application filed on Sep. 29, 2003 (Japanese Patent Application No. 2003-338907) and the contents thereof are incorporated herein by reference.

INDUSTRIAL APPLICABILITY

Figure 4:
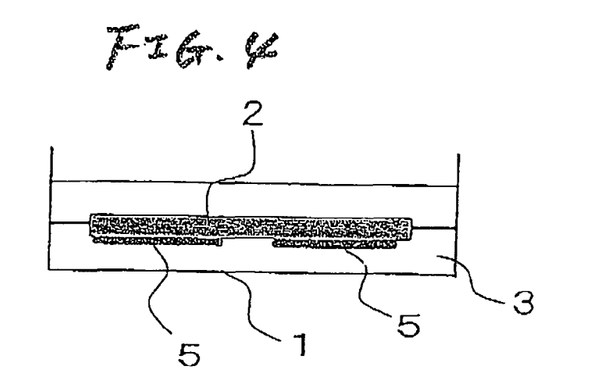
FIG. 4 is a sectional view showing a section of a processing bath as viewed from the delivery direction in the case where one film delivery holder is used and films to be delivered are aligned horizontally to form two rows.

According to this invention, by processing a plurality of films together in a production process of a polarizing film, it is possible to increase a production amount per unit time more conveniently and without deteriorating optical characteristics. When compared to polarizing films produced by using a wide width film of the conventional examples, the method of this invention of producing a polarizing film from a plurality of films as shown in FIGS. 3 and 4 enables to prevent problems such as drawbacks in optical characteristics and surface condition which have heretofore been detected in the case of using the wide width film and to achieve a production amount per unit time similar to that of producing the wide width film by using a manufacturing device having a wide width processing bath for producing the wide with polarizing film. That is, it is possible to obtain a large amount of polarizing films which are more excellent in optical characteristics. Further, though the optical characteristics tend to change largely due to a slight change in concentration of a processing liquid in a processing bath in the polarizing film production process, it is possible to achieve a desired production amount in a shorter period of time by processing the plural films together according to the production method of this invention, and the production method is less subject to influences of changes by time of substances contained in the processing liquid and the concentration of the processing liquid and enables to produce a large amount of polarizing films having substantially the same characteristics. Therefore, with the use of the production method of this invention, it is possible to obtain an effect of readily coping with an increase in production amount of the polarizing films which has been increased along with an increase in demand of image displays.

TABLE 1

| | Raw film Width (mm) | Number of Film (roll) | Production Amount per Unit Time | Dipping Pattern | Single transmittance (%) | Polarization Degree (%) |
|---|---|---|---|---|---|---|
| Example. 1 | 100 | 2 | 2 | FIG. 3 | 44.0 | 99.94 |
| Example. 2 | 100 | 3 | 3 | FIG. 7 | 44.0 | 99.93 |
| Example. 3 | 100 | 2 | 2 | FIG. 5 | 44.0 | 99.93 |
| Referential Example | 100 | 1 | 1 | — | 44.0 | 99.93 |
| Comparative Example. 1 | 200 | 1 | 2 | — | 44.0 | 99.75 |
| Comparative Example. 2 | 300 | 1 | 3 | — | 44.0 | 99.67 |

What is claimed is:

1. A method for producing a polarizing film, comprising:
playing out a plurality of films from a plurality of rolled raw films;
dyeing the films and
stretching the films,
wherein the plurality of films are in a stacked arrangement without touching throughout the method for producing the polarizing film,
wherein the plurality of rolled raw films are in a stacked arrangement without touching throughout the method for producing the polarizing film, and
wherein the films are simultaneously dipped into at least one type of processing liquid.

2. The method for producing a polarizing film according to claim 1, wherein the number of the films is 2 to 4.

3. The method for producing a polarizing film according to claim 1,
wherein the films are made of polyvinylalcohol and the processing liquid contains a dichroic substance in the dyeing step, and then the dyed films are uniaxially stretched in the stretching step.

4. A polarizing film obtained by the method according to claim 1.

5. An optical film comprising the polarizing film according to claim 4 and an optical layer provided on at least one side of the polarizing film.

6. A liquid crystal panel comprising the polarizing film according to claim 4.

7. The liquid crystal panel according to claim 6,
wherein the liquid crystal panel is produced by an in-house production method.

8. An image display comprising the polarizing film according to claim 4.

9. The image display according to claim 8,
wherein the image display is produced by an in-house production method.

10. The method for producing a polarizing film according to claim 1,
wherein a total stretch ratio is from 3.0 to 7.0 in the stretching.

11. An apparatus for producing a polarizing film, comprising:
a plurality of rolled raw films;
one processing bath containing one type of processing liquid;
a film delivery holder provided in the one processing bath and configured to deliver a plurality of films which are played out from the rolled raw films,
wherein the plurality of films are in a stacked arrangement without touching throughout the apparatus for producing the polarizing film,
wherein the plurality of rolled raw films are in a stacked arrangement without touching throughout the apparatus for producing the polarizing film, and
wherein the films are simultaneously dipped into the processing liquid without contacting each other.

12. The apparatus for producing a polarizing film according to claim 11,
wherein the number of the films is 2 to 4.

* * * * *